(12) United States Patent
Chang

(10) Patent No.: US 8,455,779 B2
(45) Date of Patent: Jun. 4, 2013

(54) CHIP CARD DEVICE

(75) Inventor: Chi-Chao Chang, Tainan (TW)

(73) Assignee: Chang Jung Christian University, Tainan (TW)

( * ) Notice: Subject to any disclaimer, the term of this patent is extended or adjusted under 35 U.S.C. 154(b) by 178 days.

(21) Appl. No.: 13/193,184

(22) Filed: Jul. 28, 2011

(65) Prior Publication Data

US 2012/0181158 A1 Jul. 19, 2012

(30) Foreign Application Priority Data

Jan. 13, 2011 (TW) .............................. 100101229 A

(51) Int. Cl.
*H01H 3/02* (2006.01)

(52) U.S. Cl.
USPC .......................................................... 200/505

(58) Field of Classification Search
USPC .................. 200/505, 502, 5 R, 5 A; 235/492, 235/487, 451; 257/679; 340/572.1, 10.33; 361/737

See application file for complete search history.

(56) References Cited

U.S. PATENT DOCUMENTS

| | | | | | |
|---|---|---|---|---|---|
| 4,627,736 | A | * | 12/1986 | Komaki | ........................... 368/88 |
| 4,777,563 | A | * | 10/1988 | Teraoka et al. | ................ 361/739 |
| 6,426,826 | B1 | * | 7/2002 | Marco | ........................... 359/230 |
| 6,863,220 | B2 | | 3/2005 | Selker | |
| 2004/0112966 | A1 | * | 6/2004 | Pangaud | ........................ 235/492 |
| 2011/0038115 | A1 | * | 2/2011 | Halkosaari | ................ 361/679.08 |

* cited by examiner

*Primary Examiner* — Edwin A. Leon
(74) *Attorney, Agent, or Firm* — Hamre, Schumann, Mueller & Larson, P.C.

(57) ABSTRACT

A chip card device includes: a first insulative substrate; a chip unit disposed on an inner side of the first insulative substrate; a first conductive wiring disposed on the inner side of the first insulative substrate, and including a first chip-connecting end that is electrically connected to the chip unit, and a first open circuit terminal opposite to the first chip-connecting end; and a second conductive wiring disposed on the inner side of the first insulative substrate and including a second chip-connecting end that is electrically connected to the chip unit, and a second open circuit terminal that is opposite to the second chip-connecting end, and that can be electrically connected to the first open circuit terminal through an external touching member.

6 Claims, 9 Drawing Sheets

CHIP CARD DEVICE

CROSS-REFERENCE TO RELATED APPLICATION

This application claims priority of Taiwanese application no. 100101229, filed on Jan. 13, 2011.

BACKGROUND OF THE INVENTION

1. Field of the Invention

This invention relates to a chip card device, more particularly to a chip card device, in which a read/write function thereof can be switched controlledly.

2. Description of the Related Art

A chip card is generally used for data storage by virtue of a chip therein, and the chip is encapsulated in an insulative material for carrying purposes. Chip cards can be divided into contactless chip cards and contact-type chip cards. Among the contactless chip cards, a radio frequency identification (RFID) tag is the most popular. The RFID tag includes a chip and a coil connected to the chip, and is sandwiched between two plastic sheets. When a magnetic field generated by a card reader passes the coil, the RFID tag is powered by a current induced by the magnetic field, thereby allowing data in the RFID tag to be read and/or written. The RFID tag is widely used in many fields, such as logistics, door security systems, identity verifications, counting, vending, etc. A user of the RFID tag (the contactless chip card) might access various card readers in daily life, and thus, the data in the RFID tag might be read and/or written unexpectedly.

In order to prevent an unexpected operation of the contactless chip cards, some of the contactless chip cards are provided with a switch mechanism. As shown in FIGS. 1 to 3, a chip card 7 disclosed in U.S. Pat. No. 6,863,220 includes two insulative substrates 71, a chip 72 disposed between the insulative substrates 71, a contact pad 73 disposed between the insulative substrates 71, two cushions 74 disposed between the insulative substrates 71 and at two opposite sides of the contact pad 73, a conductor wire 75 disposed on the cushions 74, and a coil 76 disposed between the insulative substrates 71. The contact pad 73 is electrically conductive, and is electrically connected to the chip 72. Two opposite ends of the coil 76 are electrically connected to the chip 72 and the conductor wire 75, respectively. In a normal state, the conductor wire 75 disposed on the cushions 74 is spaced apart from the contact pad 73, and thus, the coil 76 is not in a closed loop state (see FIG. 2). Accordingly, data in the chip 72 cannot be read and written in the normal state. When the chip card 7 is in a use state, the conductor wire 75 is pressed to contact the contact pad 73 such that the coil 76 is in the closed loop state, and thus, the data in the chip 72 can be read and written in the use state (see FIG. 3).

A contact type chip card, such as an ATM card, includes a chip embedded in a plastic material, and a plurality of electrodes electrically connected to chip legs of the chip, respectively. When the ATM card is in use, a card reader is placed in direct contact with the electrodes to read and write data in the chip. Nowadays, a funds transfer through the internet can be conducted at home by connecting the card reader with a computer. When conducting the funds transfer, for safety certification, the ATM card is required to be pulled out from the card reader, followed by re-inserting into the card reader. However, when the reinsertion of the ATM card is not conducted properly, it will result in transfer failure. Therefore, the funds transfer through the internet is still not stable and is inconvenient.

SUMMARY OF THE INVENTION

Therefore, an object of the present invention is to provide a chip card device that can overcome the aforesaid drawbacks associated with the prior art.

Accordingly, a chip card device of this invention comprises:

a first insulative substrate;

a chip unit disposed on an inner side of the first insulative substrate;

a first conductive wiring disposed on the inner side of the first insulative substrate, and including a first chip-connecting end that is electrically connected to the chip unit, and a first open circuit terminal opposite to the first chip-connecting end; and a second conductive wiring disposed on the inner side of the first insulative substrate and including a second chip-connecting end that is electrically connected to the chip unit, and a second open circuit terminal that is opposite to the second chip-connecting end, and that can be electrically connected to the first open circuit terminal through an external touching member.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
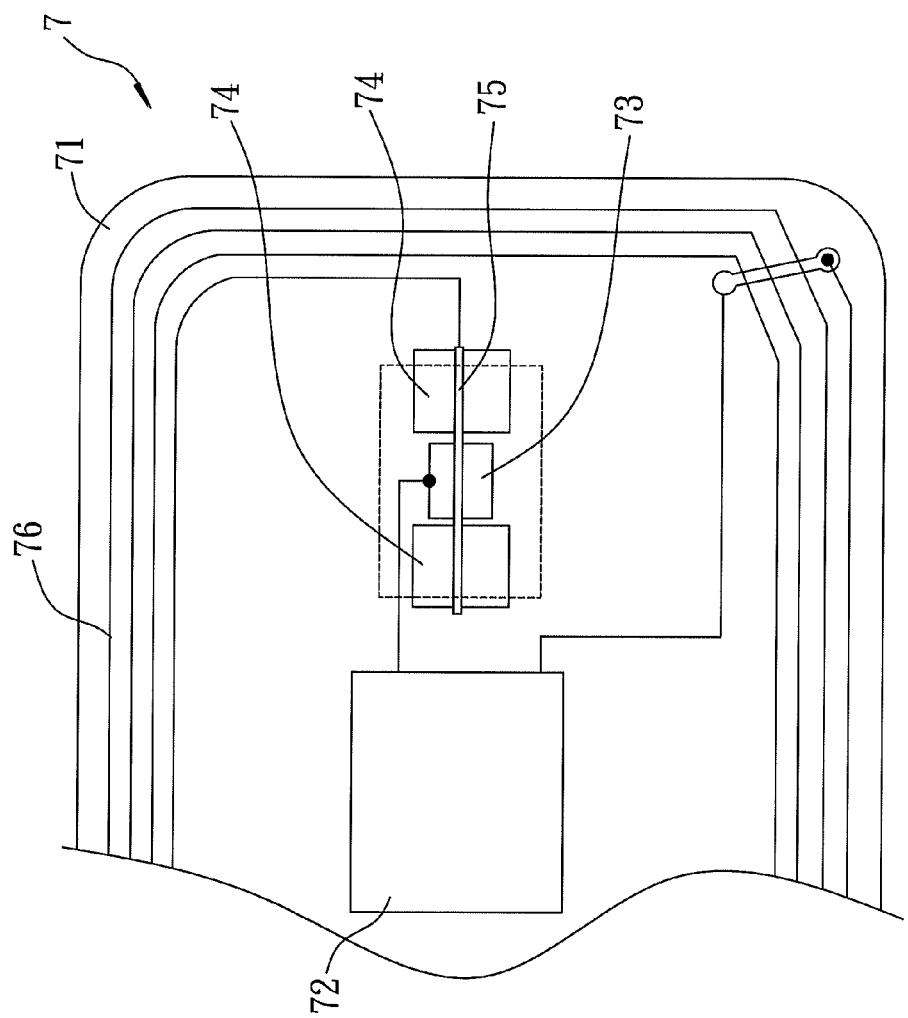
FIG. 1 is a top schematic view of a chip card disclosed in U.S. Pat. No. 6,863,200.
Figure 2:
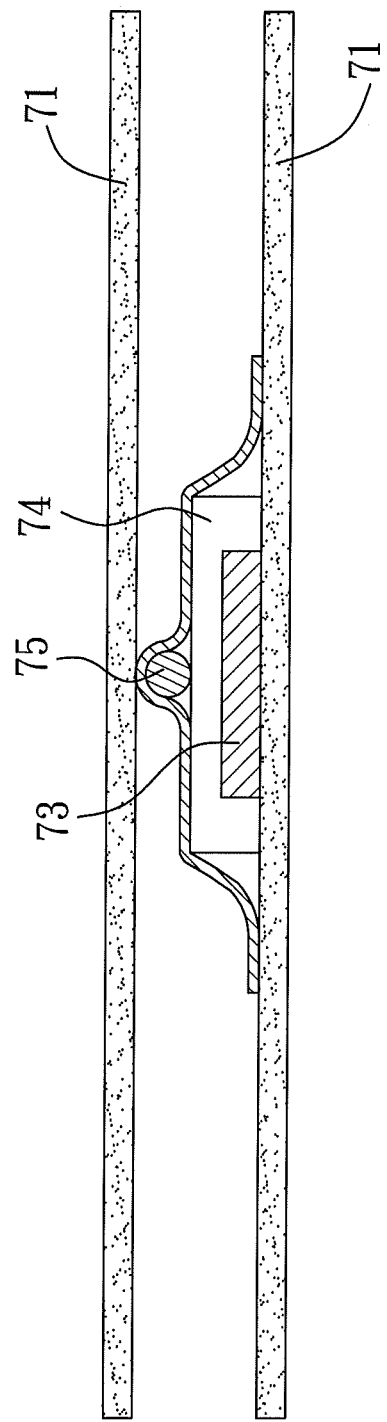
FIGS. 2 and 3 are cross-sectional views respectively illustrating normal and use states of the chip card of FIG. 1.
Figure 3:
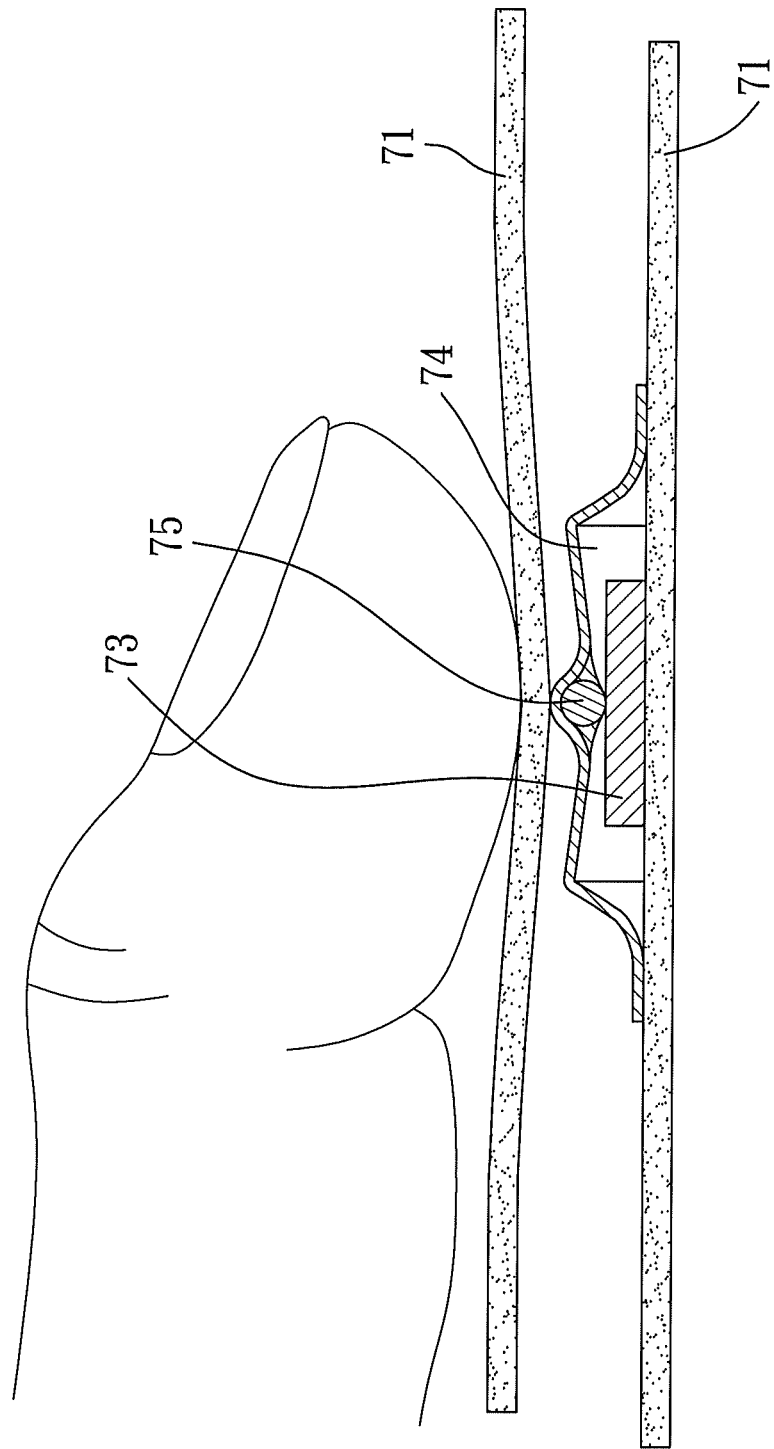

Before the present invention is described in greater detail with reference to the accompanying preferred embodiments, it should be noted herein that like elements are denoted by the same reference numerals throughout the disclosure.

Figure 4:
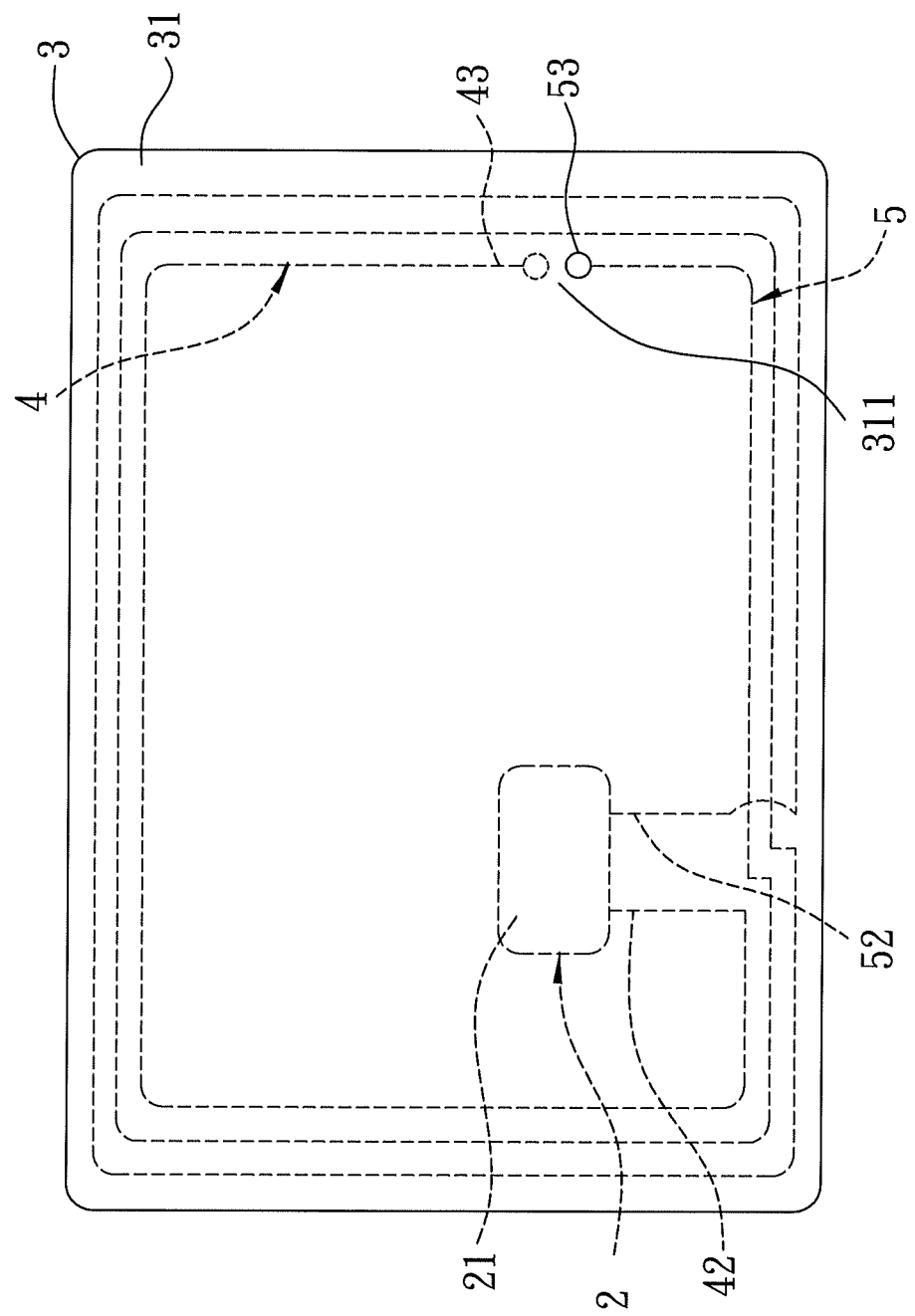
FIG. 4 is a top schematic view of the first preferred embodiment of a chip card device according to this invention.
Figure 5:
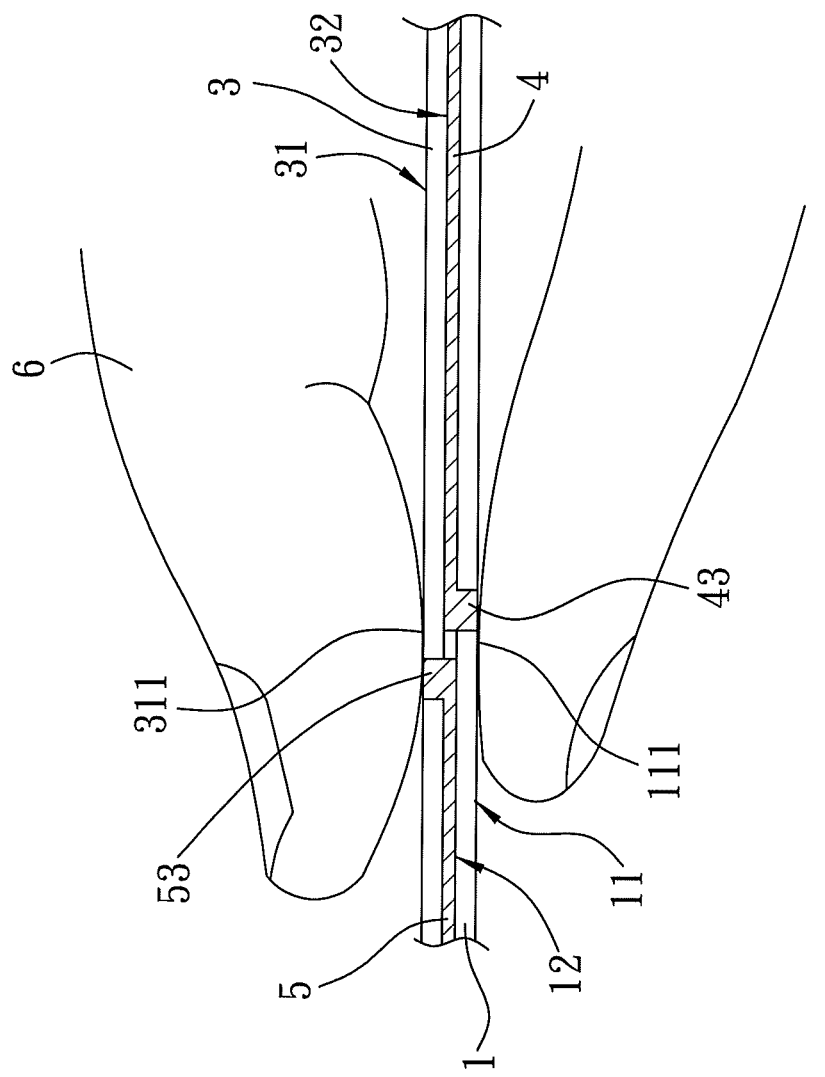
FIG. 5 is a cross-sectional view of the chip card device of FIG. 4 in its use state.

Referring to FIGS. 4 and 5, the first preferred embodiment of a chip card device according to this invention is of a contactless type, which can be placed in a closed circuit state when touched by an external touching member 6, and in which a current can be induced by a magnetic field from a card reader (not shown) so that data in the chip card device can be read and/or written when the current is induced. In this embodiment, the external touching member 6 includes two fingers of a user. The chip card device includes a first insulative substrate 1, a second insulative substrate 3 disposed on the first insulative substrate 1, a chip unit 2, a first conductive wiring 4, and a second conductive wiring 5. The chip unit 2, and the first and second conductive wirings 4 and 5 are sandwiched between the first and second insulative substrates 1 and 3.

The first insulative substrate 1 is a rectangular sheet made of an insulative material, and has an outer side 11 facing outwardly and an inner side 12 opposite to the outer side 11. The chip unit 2 includes a chip 21, i.e., a semiconductor chip. The chip 21 is disposed on the inner side 12 of the first insulative substrate 1. The outer side 11 of the first insulative substrate 1 has a first touch region 111 proximate to a periphery of the first insulative substrate 1.

The second insulative substrate 3 is in a shape of a rectangular sheet corresponding to that of the first insulative substrate 1, and has an outer side 31 facing outwardly and an inner side 32 facing the inner side 12 of the first insulative substrate 1. The outer side 31 of the second insulative substrate 3 has a second touch region 311 at a location corresponding to that of the first touch region 111.

The first conductive wiring 4 is disposed on the inner side 12 of the first insulative substrate 1, and includes a first chip-connecting end 42 that is electrically connected to the chip 21, and a first open circuit terminal 43 opposite to the first chip-connecting end 42. The first conductive wiring 4 extends along the periphery of the first insulative substrate 1 to surround the chip 21. In this embodiment, the first open circuit terminal 43 extends through the first insulative substrate 1 from the inner side 12 to the outer side 11 of the first insulative substrate 1, and thus, is exposed at the first touch region 111 to be touched by the external touching member 6.

The second conductive wiring 5 is disposed on the inner side 12 of the first insulative substrate 1, and includes a second chip-connecting end 52 that is electrically connected to the chip 21, and a second open circuit terminal 53 that is opposite to the second chip-connecting end 52 and that can be electrically connected to the first open circuit terminal 43 through the external touching member 6. The second conductive wiring 5 extends along the periphery of the first insulative substrate 1 to surround the chip 21. In this embodiment, the second open circuit terminal 53 extends through the second insulative substrate 3 from the inner side 32 to the outer side 31 of the second insulative substrate 3, and thus, is exposed at the second touch region 311 to be touched by the external touching member 6.

When using the card device, the external touching member 6 touches the first and second touch regions 111, 311 to electrically connect the first open circuit terminal 43 to the second open circuit terminal 53. In this embodiment, the user touches the first and second touch regions 111, 311 using two fingers (i.e., the external touching member 6), thereby forming a closed circuit in the chip card device.

At this moment, when the chip card device is disposed close to a card reader (not shown), data in the chip 21 can be read and/or written since the chip card device is in a closed circuit state.

In a normal state, where the first and second open circuit terminals 43, 53 are not touched by the user, the data in the chip 21 cannot be read or written by the card reader. In other words, when the chip card device of this invention is disposed in a pocket or a handbag, the data in the chip 21 cannot be unexpectedly read and/or written even if the chip card device is disposed close to the card reader. The present invention provides a simple structure for switching on or off the chip card device, through which an unexpected operation of the chip card device can be prevented. In addition, the chip card device of this invention may be used in cooperation with a card reader without the need to change the software setting of the card reader.

While the user's fingers are used as the external touching member 6 in this embodiment, other means, such as a conductive tape (not shown) or a conductive sleeve (not shown) may be used as an alternative. The conductive tape may be adhered to the chip card device in contact with both the first and second open circuit terminals 43, 53. The conductive sleeve may be sleeved around the chip card device to contact both of the first and second open circuit terminals 43, 53. When the conductive tape or sleeve is removed from the chip card device, the chip 21 cannot be read and/or written. In this case, the chip card device can serve as a product code. After a product having the chip card device thereon is purchased, it is only necessary to remove the conductive tape or sleeve to stop tracing the product.

Referring back to FIG. 4, both of the first and second conductive wirings 4, 5 are curved to form a coil in this embodiment. However, the outlines of the first and second conductive wirings 4, 5 should not be limited to this embodiment and can be varied based on the positions of the first and second open circuit terminals 43, 53. According to other embodiments, one of the first and second conductive wirings 4, 5 may be a straight line, rather than a coil.

Figure 6:
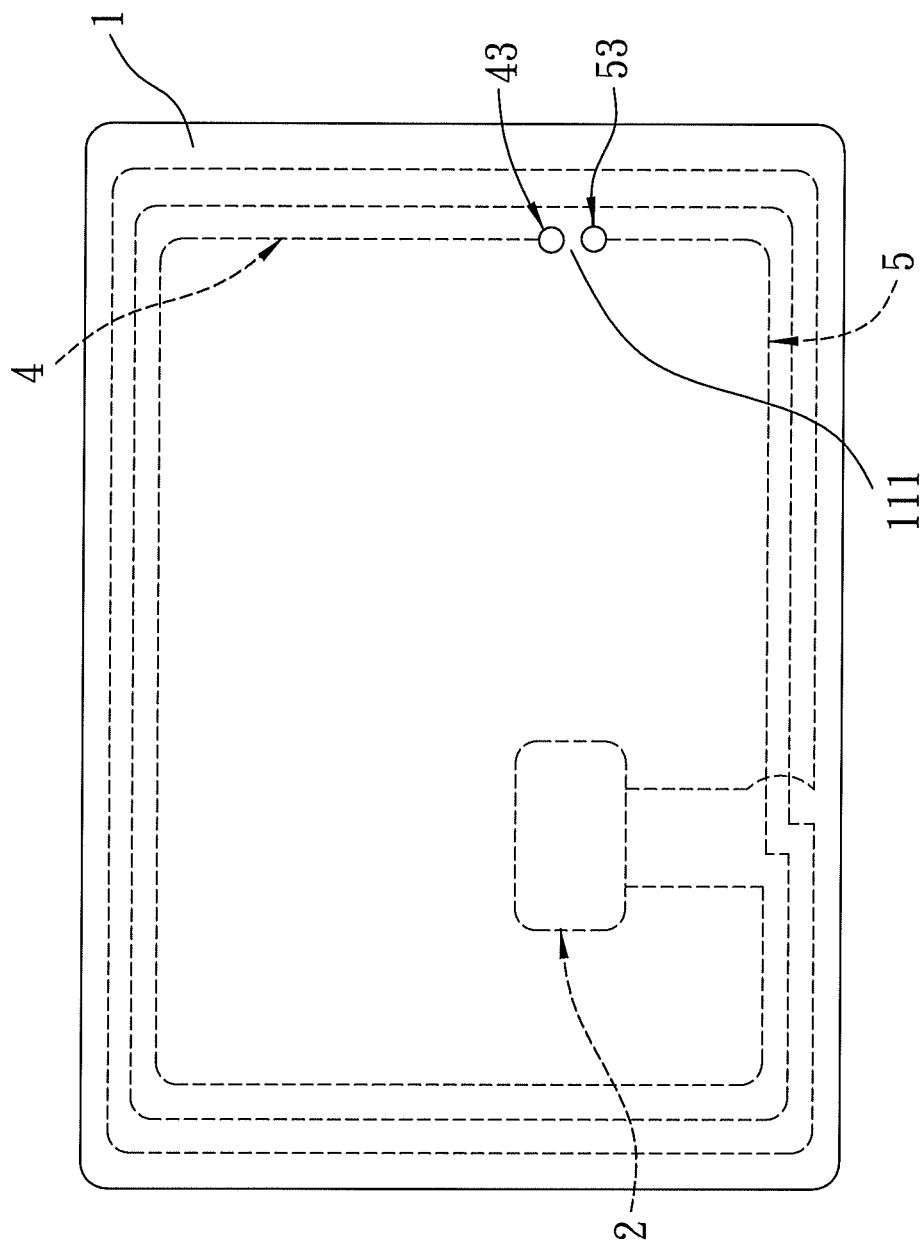
FIG. 6 is a top schematic view of the second preferred embodiment of a chip card device according to this invention.
Figure 7:
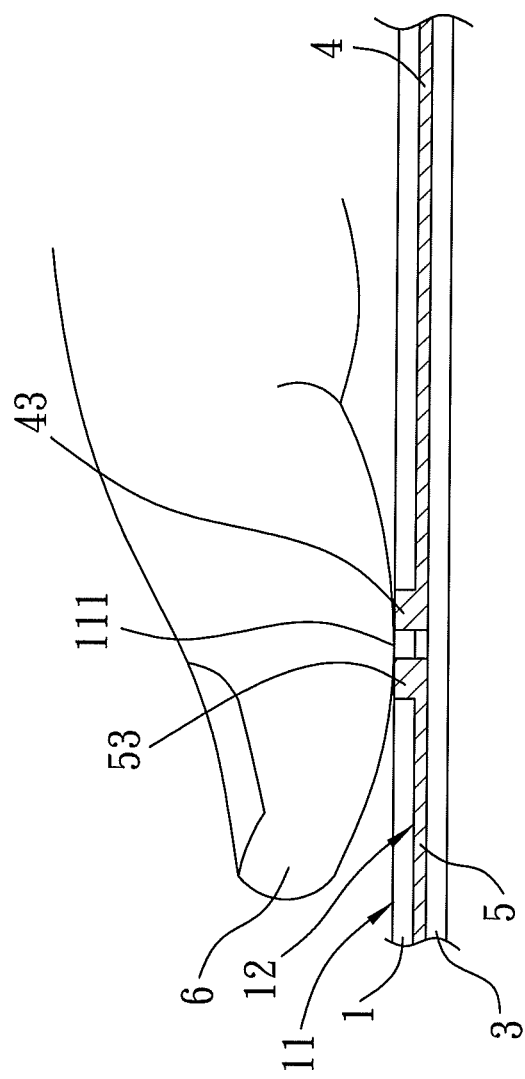
FIG. 7 is a cross-sectional view of the chip card device of FIG. 6 in its use state.

FIGS. 6 and 7 illustrate the second preferred embodiment of a chip card device according to this invention. The second preferred embodiment differs from the first preferred embodiment in that both of the first and second open circuit terminals 43, 53 extend through the first insulative substrate 1 from the inner side 12 to the outer side 11 of the first insulative substrate 1 to be exposed at the first touch region 111 for receiving a touch from the external touching member 6. In this embodiment, the external touching member 6 is one finger of a user. The size of the first touching region 111 is preferably not greater than a normal finger size so that both of the first and second open circuit terminals 43, 53 can be touched by one finger.

In other embodiments, the first and second open circuit terminals 43, 53 are arranged to extend through the second insulative substrate 3 to be exposed at the second touch region, rather than extending through the first insulative substrate 1 (not shown in FIGS. 6 and 7).

Figure 8:
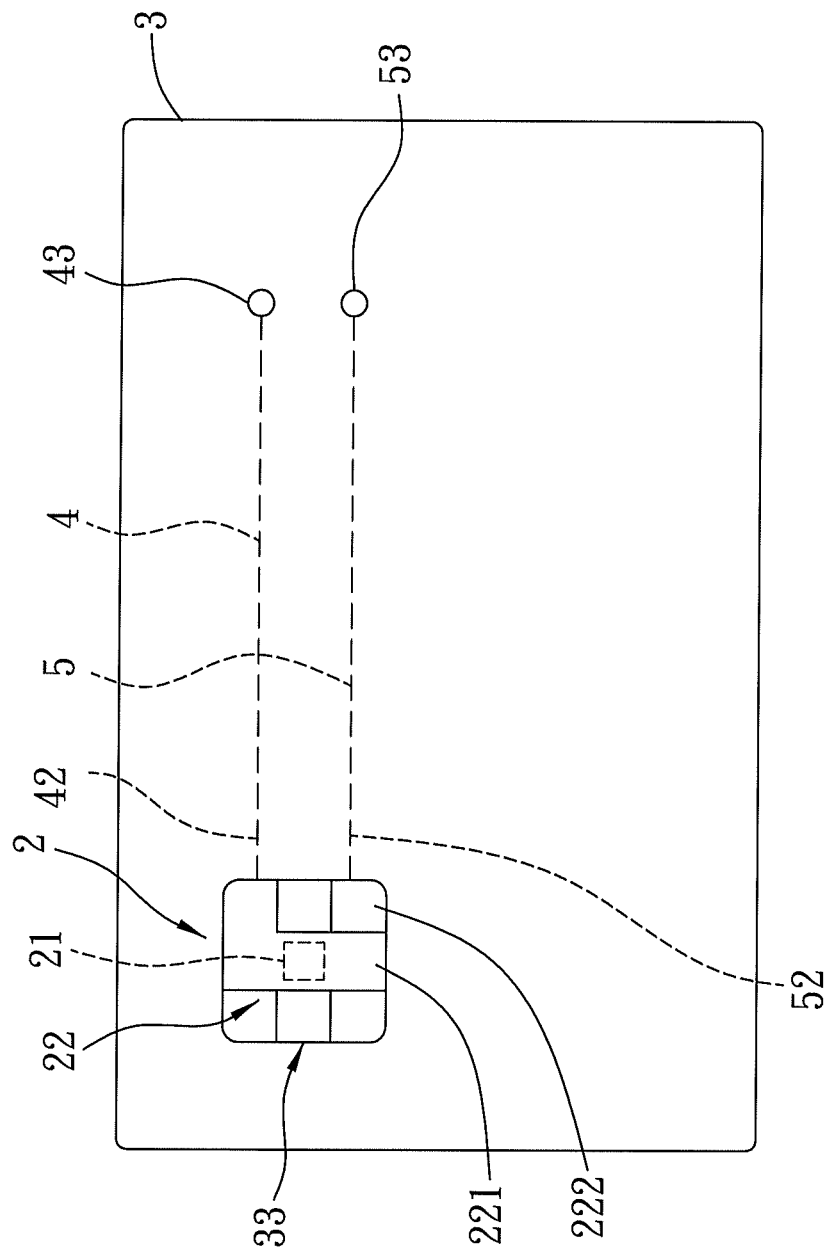
FIG. 8 is a top schematic view of the third preferred embodiment of a chip card device according to this invention.
Figure 9:
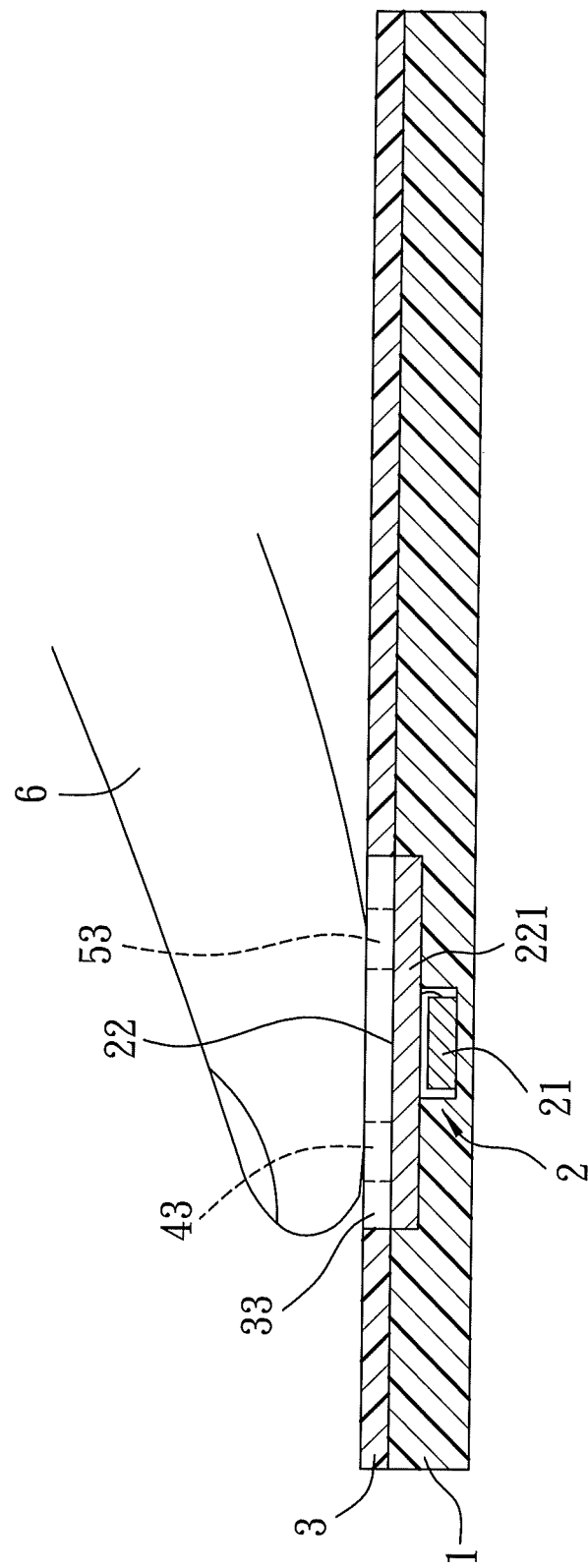
FIG. 9 is a cross-sectional view of the chip card device of FIG. 8 in its use state.

FIGS. 8 and 9 illustrate the third preferred embodiment of the chip card device according to this invention. In this embodiment, the chip card device serves as a contact-type chip card, and also includes the first insulative substrate 1, the second insulative substrate 3, the chip unit 2, the first conductive wiring 4, and the second conductive wiring 5. The first and second open circuit terminals 43, 53 of the first and second conductive wirings 4, 5 respectively extend through the second insulative substrate 3 to be exposed from the second insulative substrate 3. Of course, the first and second open circuit terminals 43, 53 can be arranged similar to that disclosed in the first preferred embodiment.

The chip unit 2 includes the chip 21 and a packaging electrode 22 that covers the chip 21. The packaging electrode 22 includes a first electrode 221 that is electrically connected to the chip 21, and a second electrode 222 that is disconnected from the first electrode 221 and the chip 21, and that is adapted to electrically connect to a chip reader (not shown). The first chip-connecting end 42 of the first conductive wiring 4 is electrically connected to the first electrode 221, and the second chip-connecting end 52 of the second conductive wiring 5 is electrically connected to the second electrode 222. In this embodiment, the first and second electrodes 221, 222 are separate metal films.

The second insulative substrate 3 has a read/write window 33 to expose the packaging electrode 22 of the chip unit 2. The read/write window 33 is adapted for the chip reader to read and write the chip unit 2. When the chip card device is inserted into the chip reader, only the second electrode 222 is electrically connected to the chip reader, and thus, a signal from the chip reader cannot be transmitted to drive the chip 21 through the second electrode 222. However, when the external touching member 6 touches the first and second open circuit terminals 43, 53 simultaneously, the first and second electrodes 221, 222 are electrically interconnected, and thus, the data in the chip 21 can be read and/or written.

Thus, in this embodiment, when the chip card device serves as an ATM card, and when a funds transfer through the internet is conducted using the chip card device of this invention, the user may remove his or her finger from the first and second open circuit terminals 43, 53 and then touch the same once again for safety certification. Re-insertion of the ATM card is not necessary.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A chip card device, comprising:
   a first insulative substrate;
   a chip unit disposed on an inner side of said first insulative substrate;
   a first conductive wiring disposed on said inner side of said first insulative substrate, and including a first chip-connecting end that is electrically connected to said chip unit, and a first open circuit terminal opposite to said first chip-connecting end; and
   a second conductive wiring disposed on said inner side of said first insulative substrate and including a second chip-connecting end that is electrically connected to said chip unit, and a second open circuit terminal that is opposite to said second chip-connecting end, and that can be electrically connected to said first open circuit terminal through an external touching member.

2. The chip card device of claim 1, wherein said first and second open circuit terminals extend through said first insulative substrate from said inner side to an outer side of said first insulative substrate, said outer side having a first touch region, said first and second open circuit terminals being exposed at said first touch region to be touched by the external touching member.

3. The chip card device of claim 1, further comprising a second insulative substrate disposed on said first insulative substrate so that said chip unit and said first and second conductive wirings are disposed between said first and second insulative substrates.

4. The chip card device of claim 3, wherein said first insulative substrate has a first touch region at an outer side of said first insulative substrate, said second insulative substrate has a second touch region at an outer side of said second insulative substrate, said first open circuit terminal extends through said first insulative substrate and is exposed at said first touch region, and said second open circuit terminal extends from an inner side of said second insulative substrate to said second touch region.

5. The chip card device of claim 3, wherein said second insulative substrate has a read/write window to expose said chip unit, said read/write window being adapted to permit a chip reader to read and write said chip unit.

6. The chip card device of claim 5, wherein said chip unit includes a chip, and a packaging electrode that covers said chip and that includes a first electrode that is electrically connected to said chip, and a second electrode disconnected from said first electrode and said chip, and adapted to electrically connect to the chip reader.

* * * * *